Oct. 10, 1950     K. K. AUGUSTIN     2,525,333
ELASTIC VEHICLE WHEEL
Filed July 29, 1947

INVENTOR.
KONRAD KURT AUGUSTIN
BY Haseltine, Lake & Co.
AGENTS

Patented Oct. 10, 1950

2,525,333

UNITED STATES PATENT OFFICE 2,525,333

ELASTIC VEHICLE WHEEL

Konrad Kurt Augustin, Pfarrwerfen, Austria

Application July 29, 1947, Serial No. 764,479
In Germany May 28, 1941

Section 1, Public Law 690, August 8, 1946
Patent expires May 28, 1961

4 Claims. (Cl. 152—47)

Elastic vehicle wheels are known in which, between the rim and the wheel body, an X-shaped rubber ring is inserted, subjected to only one mode of strains e. g. compressive strains.

In contradistinction thereto the object of the present invention is an elastic vehicle wheel in which an X-shaped rubber ring, interposed between the rim and the wheel body, is connected to the wheel body at the points of intersection of the arms, forming the X-cross section, whereby combined strains are made to result in the rubber ring, favourable for the elasticity of the wheel.

Figure 1:
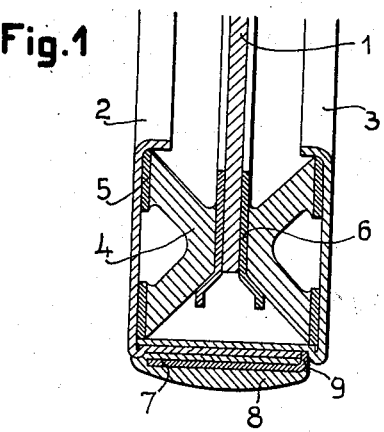
Figure 2:
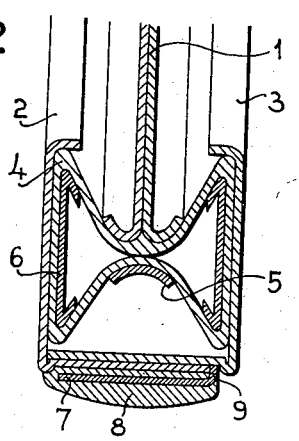
Figure 3:
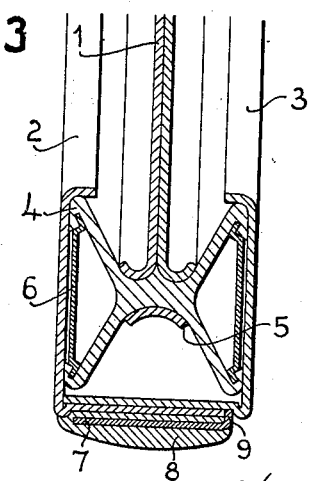

The drawing represents in the Figs. 1-3 three different embodiments of the invention in radial section.

As shown in Fig. 1 the wheel is composed of a wheel disc 1 (wheel body) rigidly fastened to the wheel axle, and of a rim 2, 3 the parts of which are connected to the wheel body by means of a rubber ring 4, having an X-shaped cross section. In the cross-section the X-shaped rubber ring 4 is composed of two V-shaped parts of which each is provided, on the outer faces of the arms, with thick metal sheets 5 attached by vulcanization, which enables said body to be screwed on to the rim parts 2, 3. In the same manner, in the middle zone of the divided rubber ring 4, i. e. on the inner face of the V-shaped parts, profiles, made of thick metal sheets 6, are attached by vulcanization, connected by screwing to the wheel disc 1, so that the latter is, by the intermediary of the rubber ring 4, combined with the two rim parts 2, 3 to form a solid elastic wheel body. As mentioned above, the rubber ring 4 is connected to the wheel body 1 at the points of intersection of its arms.

The tread proper is formed by an easily exchangeable iron tyre 7, into which rubber segments 8 are inserted, the non-skidding profile of which is adapted to the ground and the season.

In the embodiment according to Fig. 2 the elastic wheel is also composed of the wheel disc 1 and the rim parts 2, 3, but in this case the connecting rubber ring 4 is formed by a hose-like hollow profile, contracted in the middle. This hollow profile is screwed to the rim parts 2, 3 by the metal sheets 6, whereas the contracted middle zone is put under tension between a bead-like enlargement of the wheel-disc 1 and a profiled ring 5, wherefrom the cross-section results X-shaped.

According to Fig. 3 the X-shaped rubber ring 4, made of one piece, is formed into a profile open on both sides, in which the two open cross-sections are laterally closed by sheet metal profiles 6, fixed by vulcanization, said profiles being again screwed on to the rim parts 2, 3.

In all three embodiments the parts 7 and 8 are fastened to the wheel body by means of the ring 9. The arrangement and the mode of junction of the X-shaped rubber ring 4 with the wheel body 1 permits of utilizing the rubber ring in a more favourable manner for increasing the elasticity of the wheel, as the rubber ring is subjected to combined strains, so that e. g. some arms of the rubber ring are subjected to tractions and others, at the same time, to compression.

By means of textile insets it is possible to limit the elongations occurring in the rubber ring, when the wheel is loaded, and to transfer same into certain zones, so as to avoid undesirable strains of stretching and distortion. The axial forces as well as the radial forces generated are taken up by pure tensile strains of the rubber ring.

I claim:

1. An elastic vehicle wheel comprising in combination a wheel body, a rim, and a rubber ring of X-shaped cross section arranged between the rim and the wheel body and connected to the wheel body along the crossing zone of the X-shaped cross section.

2. An elastic vehicle wheel comprising in combination a wheel body, a rim, and a rubber ring of X-shaped cross section having a hose like hollow profile arranged between the rim and the wheel body and connected to the wheel body along the crossing zone of the X-shaped cross section.

3. An elastic vehicle wheel comprising in combination a wheel body, a rim, and a rubber ring of X-shaped cross section arranged between the rim and the wheel body and connected to the wheel body along the crossing zone of the X-shaped cross section between a bead-shaped disc border of the wheel body and a profiled ring.

4. An elastic vehicle wheel comprising in combination a wheel body, a rim, and a rubber ring of X-shaped cross section arranged between the rim and the wheel body, said rubber ring being composed of two parts of V-shaped cross section, each part being connected to the wheel rim and to the wheel body.

KONRAD KURT AUGUSTIN.

REFERENCES CITED

The following references are of record in the file of this patent:

UNITED STATES PATENTS

| Number | Name | Date |
|---|---|---|
| 431,512 | Dubois | July 1, 1890 |

FOREIGN PATENTS

| Number | Country | Date |
|---|---|---|
| 342,436 | Italy | Aug. 1, 1936 |
| 729,271 | Germany | Oct. 22, 1942 |